April 22, 1924.                                              1,491,068
                         A. SCHILLING
            METHOD OF PRODUCING AND RECOVERING DRIFT SALT
                         Filed Jan. 5, 1922

INVENTOR.
August Schilling.
BY
       ATTORNEYS.

Patented Apr. 22, 1924.

1,491,068

UNITED STATES PATENT OFFICE.

AUGUST SCHILLING, OF SAN FRANCISCO, CALIFORNIA.

METHOD OF PRODUCING AND RECOVERING DRIFT SALT.

Application filed January 5, 1922. Serial No. 527,222.

*To all whom it may concern:*

Be it known that I, AUGUST SCHILLING, a citizen of the United States, residing in the city and county of San Francisco and State of California, have invented certain new and useful Improvements in Methods of Producing and Recovering Drift Salt, of which the following is a specification.

In the recovery or production of solar salt from saline solutions, there is formed a small percentage of exceedingly light or fine salt which is commonly termed or known in the art as "drift salt", and as such, in the ordinary acceptation of the term, the same has little or no commercial value due to the fact that it is driven by the action of the wind to the lee side of the salt ponds, and settling thereon has intermixed therewith dust and other foreign material, and is in a somewhat mushy condition. It is the recovery of this drift salt to which the present invention is directed, so as to make a recovery thereof for utilization as salt of high purity. In the present production of solar salt, the wind in its action on the surface of the brine solution lifts from the surface of the brine a mist, and this mist is carried toward the lee shore of the pond. It contains minute particles of salt and during the travel these particles deposit on the surface of the pond, and due to the wind and wave action together with the sun action are picked up and again conveyed to the lee shore. On reaching the lee shore, no provision is made for catching and collecting this drift salt and the same is merely deposited as a scale on the mud, rocks, or boulders where it is open to the action of the sun to dry, harden, and collect dust and other foreign products. I have discovered that, by the use of relatively small sumps or traps at the lee shore of a pond, the drift salt carried by the action of the wind, waves and sun is deposited therein, and that by maintaining a brine solution in these ponds or traps, the drift salt on depositing therein will sink to the bottom of the brine solution and while there is protected from contamination and maintained in a soft condition.

The production and recovery of the drift salt for commercial purposes is dependent in the main on the depth of the pickle or brine; the action of the wind thereon, and further on the evaporation which takes place. The larger the pond, or rather the area of the pond, the greater will be the formation of the drift salt, due to the fact that there is a larger area of the pickle or brine exposed to the action of wind. For the recovery of the drift salt, it is essential that the same be received in traps, basins, receptacles, or troughs, formed on the lee side of the evaporating ponds, and which preferably form a portion or continuation thereof and contain and hold a brine solution. The brine should be of shallow depth in the ponds in order to give good action of the wind onto the brine and so as to allow for the wave action, and speedy evaporation to take place for the production of a large amount of drift salt. The drift salt forms on the surface of the pond, and being exceedingly light in its nature floats thereon, and by the wind action is slowly carried along or over the surface of the pond, and as it travels the crystals grow larger and larger, or, in other words, build up, and on reaching the lee side of the pond the same is deposited onto the brine contained within the collecting receptacles and coming into contact with such brine it sinks beneath the surface of the brine, and is deposited onto the bottom of the collecting receptacles or troughs with but a small percentage of loss. This drift salt is of high purity, and is of fair crystal size, and the state of this purity renders further refining unnecessary.

Drift salt, as at present formed, in the production of solar salt, has but little or no market value, and is somewhat mushy to the touch.

In the production of the solar salt during the day time, the temperature of the liquid in the crystallizing ponds produces evaporation, and very minute salt particles are given off substantially in the form of a mist. These particles are known as "drift salt" and are of a flaky, fluffy nature and drift along the surface of the brine, and during the course of travel combine and link up with other particles of the same nature, being directed and propelled by the action of the wind and waves, and finally some, in most cases the majority, of these light particles, drift to the lee shore, deposit themselves in the catch receptacle for the reception thereof, and due to the quiet condition of the brine therein soon sink beneath the level of the brine and are deposited in the form of very fine pure salt. Being so deposited, they are covered by the brine solution and kept free of impurities, and are in a condition to be readily harvested as the need may demand. Unless the recovery of the drift salt be made in the manner specified, the same would stack up on the lee shore of the ponds and press against the poorly protected levees, and the dust settles on the crystals so exposed to the air, and becomes cemented thereto as the crystals become dry.

From the foregoing, I am enabled during the production of solar salt to make a recovery of drift salt of such texture and purity as not to require further refining to adapt the same for human consumption. In carrying out my method, I prefer to employ a pond of the type illustrated in the accompanying drawings, and wherein:—

Figure 1:
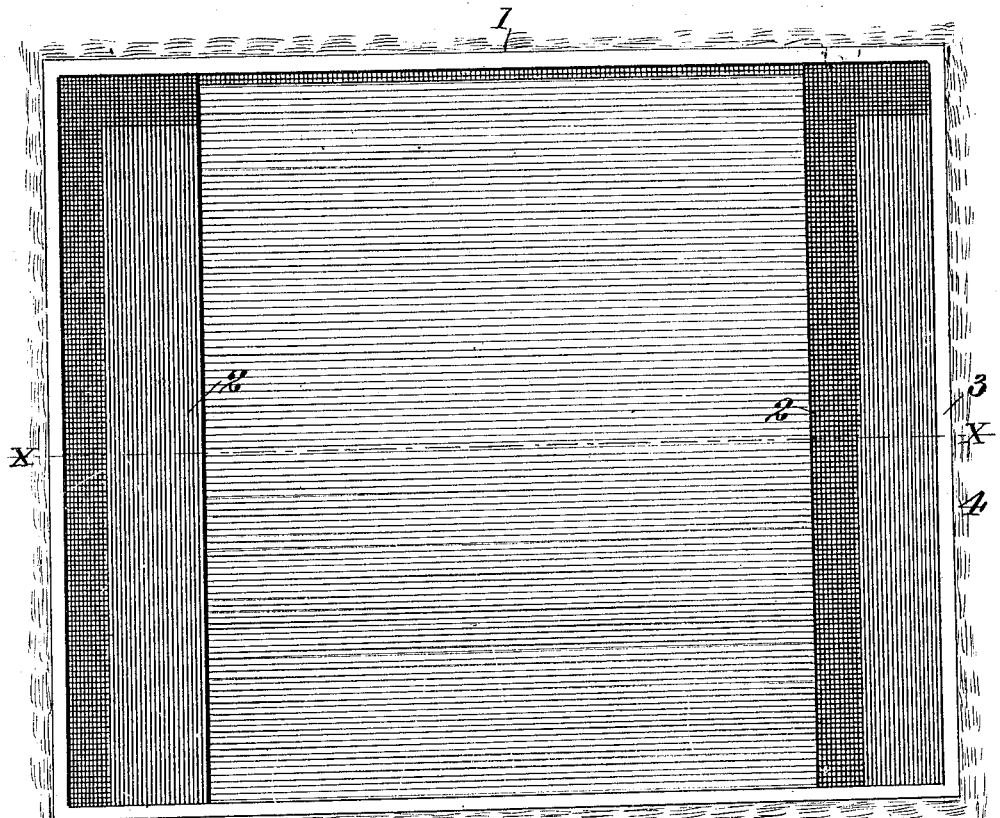
Figure 1 is a top plan view of the pond.
Figure 2:
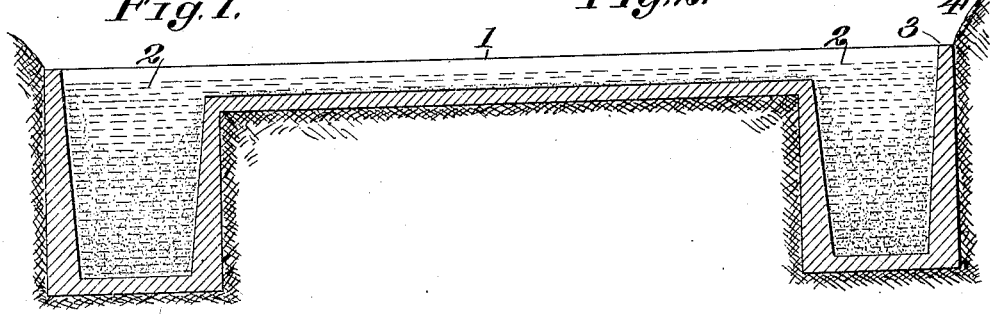
Figure 2 is a vertical sectional view taken on line X—X, Figure 1 of the drawings.

In the carrying out of the method, I provide a pond of relatively large area, and which on the lee side thereof is provided with a suitable catch trough, receptacle or basin 2, which is projected below the bottom of the evaporating pond 1, and which is, so to speak, interposed between the lee edge 3 of the pond and the bank or levee 4 embracing the same.

In any suitable manner, salt water or brine is supplied to the pond to cover the same to a depth of approximately three to eight inches, the troughs or collecting receptacles 2 being filled with brine.

During the day when the surface of the brine in the pond approaches its maximum temperature due to the solar action, very minute particles are given off, which as they crystallize, separate themselves from the brine and drift along the surface of the pond toward the lee shore thereof. During the course of travel or movement these minute particles adhere to other particles and gradually build up, and as directed or propelled by the action of the wind and waves are finally carried into the zone of the collecting receptacles or collectors 2 arranged at the lee shore of the pond, and settling gradually move beneath the body of brine solution and deposit themselves onto the bottom of the said collecting receptacles, in the same manner as the heavier magnesium salts drop to a lower level in the pond.

It will be understood that the larger the area of the pond employed, the greater will be the formation of the drift salt, and by permitting of the same traveling a considerable distance before reaching the collectors or pockets 2 surrounding the salt pond on the lee shore thereof, the crystals are given a thorough opportunity to adhere one to another, and by so doing to increase or build up in size before reaching the limit of travel, and in a measure the distance of movement controls the texture of the drift salt.

The invention may be said to reside in the recovery of the drift salt produced during the production of solar salt by trapping the drift salt on the lee side of the pond within a pocket, trough, or receptacle, filled with the brine solution, and permitting the formed crystals of drift salt to settle within the body of brine solution contained within the said trap, and by so doing, maintaining the collected drift salt free of dust and dirt, and thereby placing the same in condition for harvesting, and for use without further refining treatment.

Having thus described my invention, what I claim as new and desire to be protected by Letters Patent of the United States is:—

The method of producing and recovering drift salt during the production of solar salt which consists in depositing brine solution within a salt pond open to the action of the heat and wind, trapping in a brine containing trap at the leeward side of the pond the drifting crystals of drift salt and then removing the trapped drift salt from the brine without disturbing the solar salt within the pond.

In testimony whereof I have signed my name to this specification.

AUGUST SCHILLING.